(12) United States Patent
Kjølaas

(10) Patent No.: US 11,709,980 B2
(45) Date of Patent: Jul. 25, 2023

(54) METHOD AND TOOL FOR PLANNING AND DIMENSIONING SUBSEA PIPELINES FOR PRODUCED FLUIDS

(71) Applicant: LEDAFLOW TECHNOLOGIES DA, Asker (NO)

(72) Inventor: Jørn Kjølaas, Tiller (NO)

(73) Assignee: LEDAFLOW TECHNOLOGIES DA, Asker (NO)

( * ) Notice: Subject to any disclaimer, the term of this patent is extended or adjusted under 35 U.S.C. 154(b) by 518 days.

(21) Appl. No.: 16/881,817

(22) Filed: May 22, 2020

(65) Prior Publication Data
US 2020/0372195 A1    Nov. 26, 2020

(30) Foreign Application Priority Data
May 24, 2019    (NO) .................................... 20190663

(51) Int. Cl.
*G06F 30/28* (2020.01)
*G06F 30/13* (2020.01)
(Continued)

(52) U.S. Cl.
CPC .............. *G06F 30/28* (2020.01); *G06F 30/13* (2020.01); *G06F 2111/10* (2020.01); *G06F 2113/08* (2020.01); *G06F 2113/14* (2020.01)

(58) Field of Classification Search
CPC ...... G06F 30/28; G06F 30/13; G06F 2111/10; G06F 2113/08; G06F 2113/14; G06F 17/16; E21B 33/03; E21B 49/08
See application file for complete search history.

(56) References Cited

U.S. PATENT DOCUMENTS

2020/0348701 A1* 11/2020 Biberg ................ E21B 49/0875

FOREIGN PATENT DOCUMENTS

| WO | 2014/082916 A1 | 6/2014 |
| WO | 2015/110599 A1 | 7/2015 |
| WO | 2018/191736 A1 | 10/2018 |

OTHER PUBLICATIONS

A. Banafi, et al., "A comprehensive comparison of the performance of several popular models to predict pressure drop in stratified gas-liquid flow with low liquid loading," Elsevier Journal of Natural Gas Science and Engineering 21 p. 433-441 (Year: 2014).*

(Continued)

*Primary Examiner* — Steven W Crabb
(74) *Attorney, Agent, or Firm* — Kilpatrick Townsend & Stockton LLP

(57) ABSTRACT

The invention relates to a computer implemented method and tool for determining pressure-drop in multiphase pipeline flow where the effective surface roughness, $k_{eff}$, of liquid film coated sections of the inner pipeline wall is assumed to be equal to the maximum hydraulic roughness, $k_s^{max}$. The maximum hydraulic roughness is further assumed to be proportional to a maximum stable droplet size, $d_{droplet}^{max}$, i.e.: $k_{eff} = k_s^{max} = K \cdot d_{droplet}^{max}$, where K is a correlation coefficient. The invention further relates to applying the computer implemented method for designing a pipeline-based fluid transport system for transport of multiphase fluids.

11 Claims, 6 Drawing Sheets

(51) Int. Cl.
  *G06F 113/14* (2020.01)
  *G06F 113/08* (2020.01)
  *G06F 111/10* (2020.01)

(56) References Cited

OTHER PUBLICATIONS

Andritsos, et al., "Interfacial Instabilities for Horizontal Gas-Liquid Flows in Pipelines," *Int. J. Multiphase Flow* vol. 13, No. 5 (1987) pp. 583-603.

Asali, et al., "Interfacial Drag and Film Height for Vertical Annular Flow," *AIChE Journal*, vol. 31, No. 6, Jun. 1985, pp. 895-902.

Arai, et al., "Effect of Dispersed-Phase Viscosity on the Maximum Stable Drop Size for Breakup in Turbulent Flow," *Journal of Chemical Engineering of Japan* vol. 10, No. 4,(1977) pp. 325-330.

Belt, et al., "Prediction of the interfacial shear-stress in vertical annular flow," *International Journal of Multiphase Flow* 35 (2009) pp. 689-697.

Bonizzi, et al., "Prediction of the liquid film distribution in stratified-dispersed gas-liquid flow," *Chemical Engineering Science* 142 (2016) pp. 165-179.

Biberg, et al., "Pressure drop in low liquid loading flows—the effect of a thin liquid film on the pipe wall," *BHR Group* 18 MPT (2017) pp. 471-483.

Brinkman, "The Viscosity of Concentrated Suspensions and Solutions," *J. Chem. Phys.* 20, 571 (1952) pp. 1-2.

Haaland, "Simple and Explicit Formulas for the Friction Factor in Turbulent Pipe Flow," *Journal of Fluids Engineering* vol. 105, Mar. 1983, pp. 89-90.

Hinze, et al., "Fundamentals of the Hydrodynamic Mechanism of Splitting in Dispersion Processes," *A.I.Ch.E. Journal* vol. 1, No. 3, (1955) pp. 289-195.

Ishi, et al., "Two-Fluid Model and Hydrodynamic Constitutive Relations," *Nuclear Engineering and Design* 82 (1984) pp. 107-126.

Kjolaas, et al., "Modelling of the wall film in high-rate low liquid loading flows," *Abstract—BHR Group, Experts in Fluid Engineering* (2019) 20 pages.

Kjolaas, et al., "Pressure drop measurements in low liquid loading three-phase flows," *Abstract—BHR Group, Experts in Fluid Engineering*, (2017) 17 pages.

Fukano, et al., "Prediction of the Circumferential Distribution of Film Thickness in Horizontal and Near-Horizontal Gas-Liquid Annular Flows," *Int. J. Multiphase Flow*, vol. 15, No. 3, (1989) pp. 403-419.

Van Rossum, "Experimental investigation of horizontal liquid films," *Chemical Engineering Science*, vol. 11, (1959) pp. 85-52.

Wallis, "Horizontal Flow: The boundaries of the annular and stratified regimes in horizontal flow," *One-Dimensional Two-Phase Flow Annular Flow* (1969) pp. 316-323.

Biberg, et al., "Pressure drop in low liquid loading flows—the effect of a thin liquid film on the pipe wall," BHR Group 18 MPT 2017, 13 pages.

Kjølass, et al., "Modeling of the droplet field in near-horizontal low liquid loading flows," BHR Group 2011 Multiphase 15, 14 pages.

Kjølass, et al., "Pressure drop measurements in low liquid loading three-phase flows," BHR Group 18 MPT 2017, 16 pages.

Norwegian Search Report for U.S. Appl. No. 20/190,663 dated Dec. 12, 2019, 3 pages.

J. Laurinat, T. Hanratty and W. Jepson, "Film thickness distribution for gas-liquid annular flow in a horizontal pipe," PCH Physicochem. Hydrodyn., vol. 6, p. 179-195, 1985.

* cited by examiner

METHOD AND TOOL FOR PLANNING AND DIMENSIONING SUBSEA PIPELINES FOR PRODUCED FLUIDS

CROSS-REFERENCE TO RELATED APPLICATIONS

This application claims priority to Norwegian Patent Application No. 20190663, filed May 24, 2019, the disclosure of which is incorporated by reference herein in its' entirety.

FIELD OF INVENTION

The invention relates to a computer implemented method and tool for determining pressure-drop in multiphase pipeline flow, and further to a computer implemented method for designing a pipeline-based fluid transport system for transport of multiphase fluids. The invention is suited for planning and dimensioning subsea pipelines transporting produced hydrocarbon fluids from oil and gas reservoirs.

BACKGROUND

The capital expenses associated with developing and installing production and transportation facilities required to extract oil and gas from reserves in reservoirs beneath a seabed often requires reserves containing relatively huge volumes of extractable reserves to make the project profitable at a competitive oil and gas price. Additional and more marginal fields/discoveries often cannot justify these capital costs.

However, nearby a major field/discovery there are often discovered more economic marginal volumes. Such additional reserves may have their capital costs for developing the reserves significantly reduced by connecting their production wells to the production and/or transportation facilities developed for the major reserve. As a result, it is often laid out a web of subsea pipelines (may be denoted as tie-backs in the literature) on the seabed connecting production wells of several additional fields/discoveries in a region to a common riser of major fields/discoveries for bringing the produced hydrocarbon fluids to an offshore production facility on the surface, or alternatively to a hub or template for passing the produced hydrocarbons to a transportation pipeline to an onshore production facility, etc. Typically, the system contains one or more well(s) from one or several templates to the reservoir(s) and pipelines from the templates to the topside/onshore production facilities (e.g. platforms, separators, installation), such as illustrated schematically in FIG. 6 (the figure is a facsimile of FIG. 14 of US 2010/0059221).

The number of pipelines and pipeline lengths typically involved in development of offshore oil and gas fields makes the design, more precisely optimization of the pipeline design, an essential part of the development of oil fields. There may be considerable savings in terms of material savings, reduced need for energy to transport the produced fluids, increased transportation capacity of produced fluids, and capital costs associated with the installment of the pipeline by finding the optimized pipeline path (where to lay the pipeline in the subsea terrain) and pipeline dimensions (diameter, pump capacity, valves and so on). One key parameter in this regard is the prediction of the pressure drop of the produced fluid flow over various segments of the pipeline(s) being designed.

The produced fluids in oil and gas extraction behave typically as multiphase fluid flows which may take many different regimes such as slug flow, bubbly flow, stratified flow, annular flow, and/or churn flow, and involving complex irregular interactions between the flowing phases inducing pressure drops, deposits, liquid accumulation, unstable flows, etc. This complexity and irregularity of the multiphase produced fluid requires knowledge of the expected fluid behaviour along the entire length of the pipeline(s) being designed.

Such prior knowledge can only be attained by computational fluid dynamics. Ideally, these computational fluid dynamical calculations should be performed with three-dimensional a priori mathematical descriptions of the laws of nature governing the multiphase flow to obtain a satisfactorily robust and reliable prediction of the fluid behaviour along the pipeline. However, the pipeline lengths (may be tens of kilometres long) and number of pipelines typically involved in the development of oil and gas exploration make such "full blooded" computational fluid dynamical models far too demanding in computing power to be practically applicable for decision processes in oil and gas industry.

PRIOR ART

One approach for considerably reducing the need for computing power to solve the numerical model in computational fluid dynamics is approximating the involved flow physics such that the mathematical description may be given in less than three space dimensions. For example, assuming the multiphase flow being fully developed (having stable flow volumes of the continuous fluid phases) in a pipeline segment enables forming a one-dimensional mathematical description of the laws of nature governing the multiphase fluid flow in the pipeline segment.

An example of such approach is known from document EP 2 926 278 which teaches a method for determining flow parameters of a multiphase flow in a pipeline segment by feeding in the pipeline inclination (relative to the earth gravitational field), pipeline inner diameter and the flow volume rates of the continuous phases of the multiphase flow (typically oil, water and natural gas), and then run a computer implemented one-dimensional mathematical/numerical model based on Euler-formulated transport equations for conservation of mass, momentum, turbulence fields, energy, etc. for all fluid phases and fields of the multiphase flow. The mathematical/numerical model is closed by applying standard wall function relations to estimate the fluxes of mass, momentum and energy etc. as boundary conditions at the fluid phase interfaces. Another example of one-dimensional approach for predicting multiphase fluid flow behaviour is the commercially available computer-implemented simulation tool sold under the trademark OLGA® by Schlumberger.

However, for gas-dominated flows, it is observed that the pressure-drop may be significantly under-predicted by one-dimensional computational fluid dynamic calculations. An example of such observation is presented in FIG. 1. The figure shows predicted pressure drop for three-phase gas-dominated pipeline flows compared with experimental measurements presented in Kjolaas [1] and in Kjolaas et al. [2]. The prediction of the pressure drop was made with a commercially available one-dimensional computational fluid dynamic program sold under the trademark "LedaFlow 2.4". FIG. 1 shows measured pressure-drops for a three-phase flow having water cuts (marked by "WC" in the figure) of 0, 25, 50, and 100%, respectively, as function of the gas superficial velocity (Marked as "USG" on the figure) in an 8-inch pipeline inclined at 5° (relative to the horizontal) and fed with gas, oil and water at a pressure of 60 bar. As seen on the figure, especially for high water cuts and high superficial gas velocities, the pressure drop may be under-predicted by as much as 20-30%, which is a highly unfortunate inaccuracy for dimensioning pipelines for wet gas transport.

Laurinat et al. [3] describes a rigorous model of the phenomenon of the wall film, where the liquid distribution is modelled along the pipe perimeter by writing mass- and momentum conservation equations for the circumferential transport of the liquid along the wall. They concluded that droplet mass transfer through atomization and deposition was not sufficient to counteract gravitational drainage of the film. They thus argued that asymmetries in the film surface roughness cause secondary flow recirculation and give rise to circumferential interfacial stresses, which become significant for thin films near the top of the pipe. A similar approach is known from Bonizzi & Andreussi [4], who were able to obtain good agreement with measured film distributions by accounting for wave spreading in addition to droplet deposition and gravity.

Document WO 2018/191736 discloses a method for determining the pressure drop in low-liquid load multiphase pipeline flows which includes applying the viscosity of the liquid to estimate the effective roughness of a liquid film on the interior wall of the pipeline and then applying the effective roughness of the liquid film to determine the pressure-drop. The method is described as suited for annular flows in substantially vertical pipes at high gas rates.

Wallis [5] and Belt and Portela [6], both proposed that the interfacial friction coefficient for thin films can be represented by a relation determining the interfacial friction coefficient as a function of the ratio of liquid film thickness and pipeline diameter. Asali & Hanratty [7] proposed a somewhat similar model, but one that scales very differently with the gas density and pipe diameter. Van Rossum et al. [8] proposed that the onset of entrainment for low film Reynolds numbers (outside the disturbance wave regime) was well correlated by a critical Weber number. Biberg et al. [9] has proposed a model where they assumed that the hydraulic roughness ks equals a constant multiplied by the film thickness δ.

The above propositions of Wallis [5], Belt et al. [6], Asali & Hanratty [7], van Rossum et al. [8], and Biberg et al. [9] have been tested experimentally by the present inventor and found to have limited success with respect to the modelling of thin films. Specifically, the idea that the film thickness is given by some Reynolds number does not work for high liquid viscosities, because the film thickness then becomes unreasonably large.

There is a need for an improved approach to determine the pressure-drop in multiphase pipeline flow, and in particular for gas-dominated multiphase pipeline flows.

Objective of the Invention

The main objective of the invention is to provide a computer implemented method and tool for determining the pressure-drop in non-vertical pipeline-based transport systems for multiphase fluids, and in particular transport systems for gas-dominated multiphase fluids.

Another objective of the invention is to provide a computer implemented method and tool for determining pipeline dimensions and penstock/pipeline paths for a non-vertical pipeline-based transport system for multiphase fluids, and in particular extracted wet gas fluids from a production well to a production facility.

DESCRIPTION OF THE INVENTION

Experiments made by the present inventor and theoretical considerations indicate that the problem with under-prediction of the pressure-drop in gas-dominated pipeline flows is due to liquid at the bottom of the pipeline being "torn off" into liquid droplets and then entrained in and carried along with the relatively rapidly flowing gas phase. These liquid droplets deposit on the pipeline wall somewhat further downstream and is transformed into a relatively slow-moving film of liquid on the pipeline wall. The interaction between the liquid film and the flowing gas makes the liquid film surface considerably rougher than the surface roughness of the (dry) pipeline wall. Without being bound by theory, it is assumed that it is this relatively large surface roughness at liquid coated pipeline wall segments as compared to dry pipeline wall which causes the under-prediction of the pressure-drop. FIG. 2 is a drawing schematically illustrating a cross-sectional cut view of a non-vertical pipeline as seen along its centre axis. A "pond" (5) of liquid at the lower part of the pipeline (1) circumference is releasing droplets (4) which are entrained in the gas flow (3) and deposited in the pipeline wall (1) and forming a liquid film (2).

The present invention utilises an approach for improving the pressure-drop prediction in the multiphase fluid flow which:

a) does not try to resolve the full details of the liquid film on the pipeline wall, but instead assumes that the wall film thickness is primarily driven by droplet deposition and entrainment, b) assumes the action of gravity and secondary flows can be ignored, i.e. the present invention assumes it is unnecessary to have a detailed representation of the wall film, it is sufficient to be able to predict the average surface roughness of the liquid film and determining the frictional shear stress therefrom, and c) assumes the average effective surface roughness of the liquid film is equal to the hydraulic roughness, $k_s$, which can be determined by the following postulates:

1) The hydraulic roughness, $k_s$ of a thin liquid film scales linearly with the size of the ripples, $d_{ripple}$, on the film: $k_s = \alpha \cdot d_{ripple}$, 2) When the ripples on the film become sufficiently large, they are destroyed/atomized by the turbulent fluctuations in the gas which limits the ripple size to the value $d_{ripple}^{max}$, 3) $d_{ripple}^{max} \propto d_{droplet}^{max}$, where $d_{droplet}^{max}$ is the maximum stable droplet size as determined by a droplet model, and 4) the gas flow velocity is usually sufficiently large to effectively maintain the size of the ripples of the liquid film at $d_{ripple}^{max} \propto d_{droplet}^{max}$.

The above assumptions may be summarised as: The effective surface roughness, $k_{eff}$ of liquid film coated sections of the inner pipeline wall is assumed to be equal to the maximum hydraulic roughness, $k_s^{max}$, which is assumed to be proportional to a maximum stable droplet size, $d_{droplet}^{max}$:

$$k_{eff} = k_s^{max} = K \cdot d_{droplet}^{max} \qquad (1)$$

where K is a correlation coefficient.

Thus, in a first aspect, the invention relates to a computer implemented method for determining pressure-drop in a multiphase flow in a non-vertical pipeline having an inner wall facing the multiphase flow, where multiphase flow at least comprises a continuous gas phase forming a gas/inner wall interface and a continuous liquid phase, and wherein the method comprises:

applying a computational fluid dynamic model describing the multiphase pipeline flow, and solving the computational fluid dynamic model to determine the pressure-drop in the multiphase flow, characterized in that the computational fluid dynamic model is adapted, for the gas/inner wall interface, to:

applying an effective surface roughness, $k_{eff}$, determined by the relation: $k_{eff} = K \cdot d_{droplet}^{max}$, where K is a correlation coefficient and $d_{droplet}^{max}$ is a maximum stable droplet size as determined by a droplet model, and applying the effective surface roughness, $k_{eff}$, to determine a shear-stress, $\tau_g$, and then applying the shear-stress, $\tau_g$, as a boundary condition determining the gas flow resistance at the gas/inner wall interface.

The method of the invention according to the first aspect applies a relatively coarse, but still often acceptably accurate, approximation of the effective surface roughness, $k_{eff}$, by assuming that the entire surface area of the inner wall of the pipeline in contact with the continuous gas phase is covered by a liquid film.

However, for some applications, such as e.g. high gas load flows, the liquid droplet generation and subsequent deposition of liquid droplets may not be sufficient to form a liquid film on the entire inner wall being in contact with the continuous gas phase. A more accurate approximation will thus be obtained by applying a computational fluid dynamical model which is adapted to determine which parts of the gas/inner wall interface which are covered by a liquid film, and which parts of the gas/inner wall interface which are not covered by a liquid film.

Thus, in a second aspect, the invention relates to a computer implemented method for determining pressure-drop in a multiphase flow in a non-vertical pipeline having an inner wall facing the multiphase flow, where multiphase flow at least comprises a continuous gas phase forming a gas/inner wall interface and a continuous liquid phase, and wherein the method comprises:

applying a computational fluid dynamic model describing the multiphase pipeline flow, and solving the computational fluid dynamic model to determine the pressure-drop in the multiphase flow, characterized in that the computational fluid dynamic model is adapted, for the gas/inner wall interface, to:

determining a first fraction of the gas-wall interface considered being covered by a liquid film and a second fraction of the gas-wall interface considered not being covered by a liquid film, for the first fraction; applying an effective surface roughness, $k_{eff,1}$, determined by the relation: $k_{eff,1} = K \cdot d_{droplet}^{max}$, where K is a correlation coefficient and $d_{droplet}^{max}$ is a maximum stable droplet size as determined by a droplet model, and applying the effective surface roughness, $k_{eff,1}$, to determine a shear-stress, $\tau_{g,1}$, and for the second fraction; applying an effective surface roughness, $k_{eff,2}$, defined to be equal to a surface roughness of a dry inner wall of the pipeline, and applying the effective surface roughness, $k_{eff,2}$, to determine a shear-stress, $\tau_{g,2}$, and applying the shear-stresses, $\tau_{g1}$ and $\tau_{g2}$ as boundary conditions determining the gas flow resistance at the gas/inner wall interface.

As used herein, the term "multiphase flow" is a simultaneous flow of one or more continuous liquid phases and at least one continuous gaseous phase. The multiphase flow may exist as a homogeneous mixture or as independently flowing fluid phases which may attain complex interactions causing flow phenomena such as slug flow, mists, emulsions, or bubble flow. The pressure-drop in multiphase flows may be significantly higher than pressure-drops found in single-phase flows.

The term "multiphase flow in a non-vertical pipeline" as used herein encompasses any gas and liquid containing multiphase flow in a pipeline where a liquid phase may be expected to flow along the lower part (relative to the earth gravitational field) of the inner wall of the pipeline. I.e. multiphase flows in pipelines where the pipeline does not ascend/descend too steep to enable forming a substantially continuous liquid phase at the lower part of the pipeline circumference. In practice, the term "non-vertical" encompasses pipeline flows where the pipeline inclination angle (towards the horizon) is in the range of from −75° to +75°, where a positive inclination angle corresponds to the pipeline ascending in the flow direction, a negative inclination angle corresponds to the pipeline descending in the flow direction, and inclination 0° corresponds to the pipeline being horizontal relative to the earth gravitation field. The pipeline encompasses any form of tube/pipe being applied to transport or move a multiphase fluid flow, such as e.g. tie-backs, oil and gas production bore tubes, transport pipes in pharmaceutical and/or chemical industrial process facilities etc.

The term "computational fluid dynamic model" as used herein encompasses any computer implemented numerical model able to solve the laws of nature governing the multiphase fluid flow inside a pipeline, and which enables determining which part of the surface of the inner wall of the pipeline which is in contact with the at least one continuous gas phase of the multiphase flow. The invention according to the first and second aspect may apply any known computational fluid dynamic model having the above-given properties which applies a three-, two- or one-dimensional mathematical description of the laws of nature governing the fluid flow.

The at least one continuous gas phase may, and often will, contain a multitude of entrained liquid droplets torn of the at least one continuous liquid phase (typically being present at the bottom of the pipeline). Some of these entrained liquid droplets will, depending on the gas flow velocity and other flow characteristics, deposit on the gas/inner wall interface. For surface areas of the inner wall exposed to relatively heavy liquid droplet deposition, the deposited liquid droplets will form a liquid film covering this part of the inner wall. However, for surface areas of the inner wall not exposed to relatively heavy liquid droplet deposition, there will be no effective liquid film formation, and, in some cases, the inner pipeline wall may even be dry. Thus, the term "gas/inner wall interface" as used herein encompasses both surface area of the inner pipeline wall facing a continuous gas phase being covered by a liquid film and surface area of the inner pipeline wall facing a continuous gas phase not being covered by a liquid film.

The invention according to the first and second aspect applies to all multiphase flows in pipelines involving a gas flow as a separate phase (and not solely as small dispersed bubbles inside the liquid). The invention according to the first and second aspect is especially suited for predicting the pressure-drop in pipeline-based transport systems where the gas volume fraction of the multiphase flow, measured as the ratio of the flow volume rate of the continuous gas phase over the sum of the flow volume rate of all present continuous liquid phases, is higher than 50%, preferably higher than 75%, and most preferably higher than 90%. Such multiphase flows have typically a relatively large continuous gas phase occupying a significant volume (the gas zone) of the pipeline such that the flow resistance at the gas-inner wall interface may significantly influence the pressure-drop of the multiphase flow. Especially if the gas-inner wall interface is covered by a liquid film.

An example embodiment of a computational fluid dynamic model suited for being used in the first and the second aspect of the invention is a "hybrid model" approach, which considers the multiphase fluid to consist of two or more continuous fluid phases being separated by large-scale interfaces and further consisting of one or more dispersed fluid phases such as e.g. bubbles/droplets of one fluid suspended in a continuous phase of another fluid. The hybrid model approach considers each of the continuous and each of the dispersed fluid phases in the multiphase flow to be a separate fluid field. The velocities of the continuous fluid fields are obtained by solving the respective momentum equations, while the velocities of the dispersed fields are calculated from empirical "slip relations", which are expressions that describe the velocity difference between the dispersed fields and the associated continuous field. The simplest version of a slip relation is to simply assume that the velocity difference is zero, meaning that the dispersed field has the same velocity as the associated continuous field. The purpose of using slip relations instead of momentum equations for the dispersed fields is to reduce the computational cost of solving the equations, thus reducing the execution time for simulations.

An example embodiment of a hybrid computational fluid dynamic model suited for use in the first and the second aspect of the invention may advantageously describe the multiphase pipeline flow as a set of fluid fields representing:
  a set of continuous fluid phases being separated by large-scale interfaces, at least comprising a continuous liquid phase and a continuous gas phase being separated by a large-scale gas/liquid interface, and
  a set of dispersed phases, at least comprising a dispersed phase of liquid droplets entrained in the continuous gas phase, and wherein
  each continuous fluid field is described by Eulerian formulated volume and ensemble averaged turbulent transport equations which are solved for each continuous fluid field, and
  each of the dispersed phases is described by "slip relations", which are expressions that describe the velocity difference between the dispersed fields and the associated continuous field.

The term "continuous fluid phase" as used herein is a phase in which droplets, bubbles, and particles are dispersed. In a multiphase flow of water, oil, and natural gas, each of these will form a stratified continuous phase separated by a large-scale interface. The term "field" is used to describe the physical appearance of a phase. The water may i.e. be present in the multiphase as the following fields; water droplet in gas, water droplet in oil, continuous water phase, water condensate film at pipe wall etc. The term "large scale interface" means the interface between two continuous phase regions in the multiphase flow.

The hybrid computational fluid dynamic model enables determining the production rate of liquid droplets being torn-off from a continuous liquid phase and being entrained in the continuous gas phase. This information may, in one example embodiment, be applied to determine which parts of the gas/wall interface being covered by a liquid film and which parts of the gas/inner wall interface not being covered by a liquid film. Hybrid computational fluid dynamic models are inherently "made ready" for determining a liquid droplet concentration profile, $C_{in\ gas}^{droplet}(y)$, in the continuous gas phase as a function of vertical distance above the large-scale interface separating the continuous liquid phase and the continuous gas phase, and is thus especially suited for use in the second aspect of the invention.

If the pipeline section is non-vertical, which in practice means the pipeline has an inclination angle in the range of from −75° to +75°, where 90° is vertical relative to the earth gravitational field, there will usually be a continuous liquid phase at the lower part of the pipeline along the length of the section which interacts with the flowing continuous gas phase such that liquid droplets are being formed, entrained by and carried along with the relatively fast flowing continuous gas phase. The resulting liquid droplets in the continuous gas phase will gradually hit and be adsorbed by the inner wall and/or hit and fall back and be absorbed by the continuous liquid phase at the bottom of the pipeline and thus lowering the liquid droplet concentration with increasing height (inside the pipeline) above the liquid phase. The liquid droplets hitting the inner wall at the gas/wall interface will wet the inner wall and may with sufficiently high droplet concentration form a film of liquid at the gas/wall interface covering the entire inner wall. The invention according to the first aspect of the invention is suited for such cases. On the other hand, if the liquid droplet concentration in the continuous gas phase is too low to form a liquid film covering the entire inner wall at the gas/wall interface, there will typically be a region of the inner wall (at the gas/wall interface) not having a liquid film and a region being covered by a liquid film. The invention according to second aspect is suited for such cases but may of course also be applied for cases where the entire inner wall at the gas/wall interface is covered by a liquid film. In the physical world, there will usually be a gradual transition from completely wetted (i.e. covered by a liquid film) inner wall to a dry wall. However, in practice, the transition from wet to dry inner wall may be well approximated by introducing a critical droplet concentration criterium determining which part of the inner wall at the gas/inner wall interface is covered by a liquid film and which part is to be considered being dry.

Thus, in one example embodiment, the invention according to the second aspect further comprises applying a hybrid computational fluid dynamic model adapted to determine a liquid droplet concentration profile, $C_{in\ gas}^{droplet}(y)$, as a function of vertical distance above a large-scale interface separating a continuous liquid phase and a continuous gas phase and which further assumes that the inner wall of the pipeline is covered by a liquid film when $C_{in\ gas}^{droplet}(y) \geq C_{crit}^{droplet}$, where $C_{crit}^{droplet}$ is a cut-off threshold, and that the inner wall of the pipeline is dry when $C_{in\ gas}^{droplet}(y) < C_{crit}^{droplet}$.

Analyses of experimental flow data indicate that a reasonable value for $C_{crit}^{droplet}$ is around $10^{-5}$ for hydrocarbon liquids, while a significantly lower value of around $10^{-9}$ should be applied for aqueous liquids. The reason for this variation is believed to be caused by differences in the attraction forces between the wall and the liquid. Specifically, aqueous liquids are observed to very easily stick to the steel walls of the pipe, and this adhesive behaviour facilitates build-up of a wall film at lower droplet concentrations than hydrocarbon liquid, which does not exhibit this behaviour.

An example embodiment for determination of the critical droplet concentration $C_{crit}^{droplet}$ suitable for use in the invention according to second aspect is given by the following expression:

$$\log_{10} C_{crit}^{droplet} = -\min[\max(250 \cdot \sigma_{gl}, 4.0), 9.0] \quad (2)$$

where $\sigma_{gl}$ is the gas-liquid surface tension.

The term "a surface roughness of a dry inner wall of the pipeline" as used herein, is the surface roughness of the inner wall of the pipeline in dry condition, i.e. without a liquid film or deposited liquid droplets. The surface roughness of a (dry) pipeline wall is a material property of material of the pipeline, which usually is a steel.

The term "correlation coefficient K" as used herein, is a coefficient introduced to make the assumption that the average effective surface roughness of liquid-film covered gas/inner wall interface is proportional to a maximum stable droplet size $d_{droplet}^{max}$ (of the same liquid as constituting the liquid film). The correlation coefficient K can be determined experimentally by applying experimentally measured pressure-drops for various multiphase flows in a pipeline segment and then applying a computational fluid dynamical to model the same multiphase flows in the pipeline segment to tune which effective wall roughness at the gas/inner wall interface which gives a match between the measured and calculated pressure-drop.

The term "a predetermined maximum droplet size, $d_{droplet}^{max}$" as used herein is a maximum stable droplet size as determined from a droplet model which typically balances the destructive forces of turbulence on the droplet and the stabilising force of the liquid of the droplet. There are known several liquid droplet models in the literature, all of which may be applied in the present invention according to the first and second aspect.

An example embodiment of a droplet model suitable for use in the method according to the first aspect of the invention, is a model developed by Arai et al. [11]:

$$d_{droplet}^{max} = d_{Arai} = 0.725 \left(\frac{\sigma^*}{\rho_g}\right)^{0.6} \varepsilon^{-0.4} \quad (3)$$

where $\sigma^* = \sigma_{gl}(1 + k \cdot Ca)$, where $\sigma_{gl}$ is the surface tension between the liquid and the gas, k is a correlation coefficient, and Ca is a capillary number defined to be:

$$Ca = \frac{\mu_d (\varepsilon \cdot d_{droplet}^{max})^{1/3}}{\sigma_{gl}} \quad (4)$$

where $\mu_d$ is the dynamic viscosity of the liquid droplet, $\rho_g$ is volumetric density of the continuous gas phase, and c is the energy dissipation rate per unit mass given by the relation:

$$\varepsilon = \frac{S_g \tau_g u_g + S_i \tau_i \Delta u}{0.25(S_g + S_i)\rho_g D_{hg}} \quad (5)$$

where $S_g$ is the gas perimeter, $\tau_g$ is the gas-wall shear stress, $u_g$ is the gas velocity, $S_i$ is the interface perimeter, $\tau_i$ is the interfacial shear stress, $\Delta u$ is the gas-liquid slip velocity, and $D_{hg}$ is the hydraulic diameter for the continuous gas phase. The $\sigma^*$, or more precisely, the content of the parenthesis, $(1+k \cdot Ca)$, may be considered being a viscosity correction term.

This model contains the maximum droplet size $d_{droplet}^{max}$ on both sides of the equality sign, requiring an iterative method to obtain a value. To simplify the calculation, one may approximate the droplet size in equation (4) using the droplet size model derived by Hinze [10]:

$$d_{Hinze} = 0.725 \left(\frac{\sigma_{gl}}{\rho_g}\right)^{0.6} \varepsilon^{-0.4},$$

so that equation (4) becomes:

$$Ca = \frac{\mu_d (\varepsilon \cdot d_{Hinze})^{1/3}}{\sigma_{gl}}.$$

The Hinze droplet size model ($d_{Hinze}$) is equivalent to the Arai model (equation (3)) for the limiting case of zero viscosity. By applying the Hinze model in equation (4), $d_{droplet}^{max}$ can be calculated explicitly, without iterations.

Arai et al. [11] pointed out that the maximum droplet size did not increase indefinitely with the viscosity in their stir tank experiments, like their model suggests. Instead it seemed to level off at a certain point. Arai et al. reasoned that the cause of this was that when the viscosity became large enough, re-establishing the spherical form after deformation would be delayed by the viscous forces, allowing the turbulence to further deform already deformed droplets, facilitating the break-up process. Arai et al. did however not attempt to model this phenomenon.

FIG. 3 is a diagram showing the ratio between the surface roughness and dame plotted against the capillary number Ca. The black dotted line is to the left of the breaking point marked cut-off according to the droplet model of Arai et al. when the correlation coefficient k=33, i.e. which corresponds to eqn. (7) below. The experimental data in FIG. 3 indicates that above a certain capillary number, the effective roughness stops increasing, which is qualitatively consistent with the observations by Arai et al. This effect is taken into account in the present example embodiment for droplet model by introducing a cut-off in the viscosity correction term equal to a value of 6.6. The figure contains some experimental data points (at the upper right of the figure) which exceeds this cut-off, but these are ignored in order to keep the droplet model simple. With these corrections, $\sigma^*$ may be given with a viscosity correction term as follows:

$$\sigma^* = \sigma_{gl} \cdot \min[(1+33 \cdot Ca), 6.6] \quad (6)$$

The viscosity correction by Arai et al. including the present introduced cut-off criterium and experimentally determined correlation coefficient, k, may be introduced into eqn. (1) to give:

$$k_{eff} = 0.052 \cdot \min[(1+33 \cdot Ca), 6.6]^{0.6} d_{Hinze} \quad (7)$$

The viscosity correction may in other words be expressed by using the Hinze droplet model to determine the maximum droplet size and expressing the correlation coefficient, K, in the assumption summarised in eqn. (1) as a relation containing the capillary number, Ca. The above expression, eqn. (7), for the effective surface roughness has been shown to function well in correcting computational fluid dynamic predictions of pressure-drop in multiphase pipeline flows for two-phase flows.

For three phase flows, the relatively rapid flow rate of the gas phase usually effectively mixes the two liquid phases and forms an emulsion-like state where one liquid is suspended and dispersed as droplets in the other. This is expected to affect the viscosity and the surface tension of the liquid (emulsion). It is also observed that when such suspension forms, the viscosity effect on the effective surface roughness does not level-off. The reason for this observation may be that the dynamic behaviour of liquids with a dispersion-enhanced viscosity differs from that of pure liquids. To account for this observation, the present inventor proposes to treat the effect of the pure viscosity and the dispersion effect separately, only imposing a limit on the effect of the pure liquid viscosity. This leads to the following expression for the effective wall roughness $k_s$:

$$k_{eff} = 0.052 \cdot \left( \min(1 + 33 \cdot Ca, 6.6) + 33 \cdot \left( \frac{\mu_l^{eff}}{\mu_l^{pure}} - 1 \right) \cdot Ca_{pure} \right)^{\frac{3}{5}} \cdot d_{Hinze} \quad (8)$$

where $\mu_l^{eff}$ is the effective dynamic viscosity of the liquid mixture and $\mu_l^{pure}$ is the dynamic viscosity of the major continuous liquid phase, and $Ca_{pure}$ is the capillary number Ca calculated by using $\mu_l^{pure}$.

The dynamic viscosity of a liquid mixture, $\mu_l^{eff}$ may be determined by using an emulsion model. Different fluid systems display different behaviours in this respect, and the emulsion model must be selected accordingly. One such model was developed by Brinkman [12] which states that:

$$\mu_l^{eff} = \mu_l^{pure}(1-\varphi)^{-2.5} \quad (9)$$

where $\varphi$ is the intrinsic volumetric fraction of liquid droplets suspended in the major continuous liquid phases. In the special case where one liquid (with volume fraction $\alpha_1$) is completely dispersed into another liquid (with volume fraction $\alpha_2$), $\varphi$ is given by:

$$\varphi = \frac{\alpha_1}{\alpha_1 + \alpha_2} \quad (10)$$

Computational fluid dynamic models describing multiphase flows involving liquids and gases typically determines the droplet concentration of liquid suspensions and may thus be adapted to incorporate the emulsion model of Brinkman to determine the effective dynamic viscosity of the mixed liquid film.

The gas-liquid surface tension of the liquid film formed by the suspension is for simplicity assumed to be a simple arithmetic average of the surface tension values for both liquid phases using the respective average volumetric phase fractions $\alpha_1$ and $\alpha_2$ as weighting parameters:

$$\sigma_{eff} = \frac{\alpha_1 \sigma_1 + \alpha_2 \sigma_2}{\alpha_1 + \alpha_2} \quad (11)$$

The average phase fractions $\alpha_1$ and $\alpha_2$ are parameters typically being determined by computational fluid dynamic models able to handle multiphase fluid flows.

An example embodiment suited for use in the method according to the first invention for converting the average effective surface roughness to the shear stress at the gas-wall interface in the gas zone is applying a friction factor model that accounts for the wall roughness, such as e.g. the Haland model [13] to determine a gas friction coefficient $f_g$ from the effective surface roughness, $k_{eff}$, by the relation:

$$\frac{1}{\sqrt{f_g}} = -3.6 \log_{10}\left[ \frac{6.9}{Re_g} + \left( \frac{k_{eff}}{3.7 D_{hg}} \right)^{1.11} \right] \quad (12)$$

Here $Re_g$ is the gas Reynolds number and $D_{hg}$ is the hydraulic diameter for the continuous gas phase. The gas Reynolds number is defined as:

$$Re_g = \frac{\rho_g \mu_g D_{hg}}{\mu_g} \quad (13)$$

Here, $\rho_g$ is the gas density, $u_g$ is the gas velocity, and $\mu_g$ is the gas viscosity. The hydraulic diameter for the continuous gas phase $D_{hg}$ may be calculated as:

$$D_{hg} = \frac{\alpha_g \pi D^2}{S_g + S_i} \quad (14)$$

where $\alpha_g$ is the volume fraction of the gas zone, D is the pipe diameter, and $S_g$ is the length of the gas-wall perimeter.

And then apply the gas friction coefficient $f_g$ to calculate the gas shear stress $\tau_g$ according to the relation:

$$\tau_g = \frac{1}{2} f_g \rho_g |u_g| u_g \quad (15)$$

For very low liquid loads flows, e.g. flows where USL≤0.01 m/s, the liquid phase at the bottom of the pipeline may become very thin and narrow. Here "USL" is superficial velocity of the liquid phase, i.e. the volumetric liquid flow divided by the cross-sectional area of the pipeline segment. Since this liquid phase is the source of the droplet field, the droplets need to travel laterally to deposit on the side walls, and if the lateral distance is very large, the droplets may not be able to reach the side walls. This effect is in the example embodiment of the invention taken into account by applying a correction which says that the width of the droplet field cannot be greater than a constant multiplied with the width of the bottom film. The best results were obtained by selecting a value of 7.0 for this constant. If the width of the droplet field is smaller than the pipe diameter, we assume that the part of the wall outside this range is dry. This effect is however typically unimportant, unless the liquid rate is very small (USL≤0.01 m/s).

In a third aspect, the invention relates to a computer implemented method for designing a pipeline-based fluid transport system for transport of multiphase fluids, where the method comprises:
  applying the method according to the first or the second aspect of the invention to numerically predict the pressure-drop when loading an intended flow rate volume of the multiphase fluid through a set of pipeline segments having different inner diameters and inclination angles towards the earth gravitational field, and
  applying the determined pressure-drops to optimise the pipeline diameter and the pipeline trajectory/path in the terrain/seabed with aim of minimising material use in the pipeline-based fluid transport system and energy consumption for operating the pipeline-based fluid transport system.

The method according to the first aspect of the invention has the advantage of being significantly more accurate than known prior art one-dimensional computer implemented methods and also significantly less demanding in computing power for numerically predicting the pressure-loss in a pipeline segment. This enables a significantly more extensive use of the method to optimizing and trouble-shooting projected pipeline-based fluid transport systems than what is possible with known prior art models. For example, the under-prediction in pressure-drops shown in FIG. 1, would if applied to build a pipeline based on those predictions, result in a pipeline-based transport system lacking pumping power of around 1 MW for a 20 km long pipeline. There may be truly vast savings in costs, material consumption (pipeline steel, number of pressure boosting pumps, valves etc.), and energy consumption during operation of the pipeline-based fluid transport system by being able to predict relatively accurately the fluid flow behaviour in the pipeline system to identify a good balance need for pipeline dimensions (diameter etc.) and pipeline length (compromise between steepness and detour lengths in rugged terrain, etc.).

LIST OF FIGURES

Figure 1:
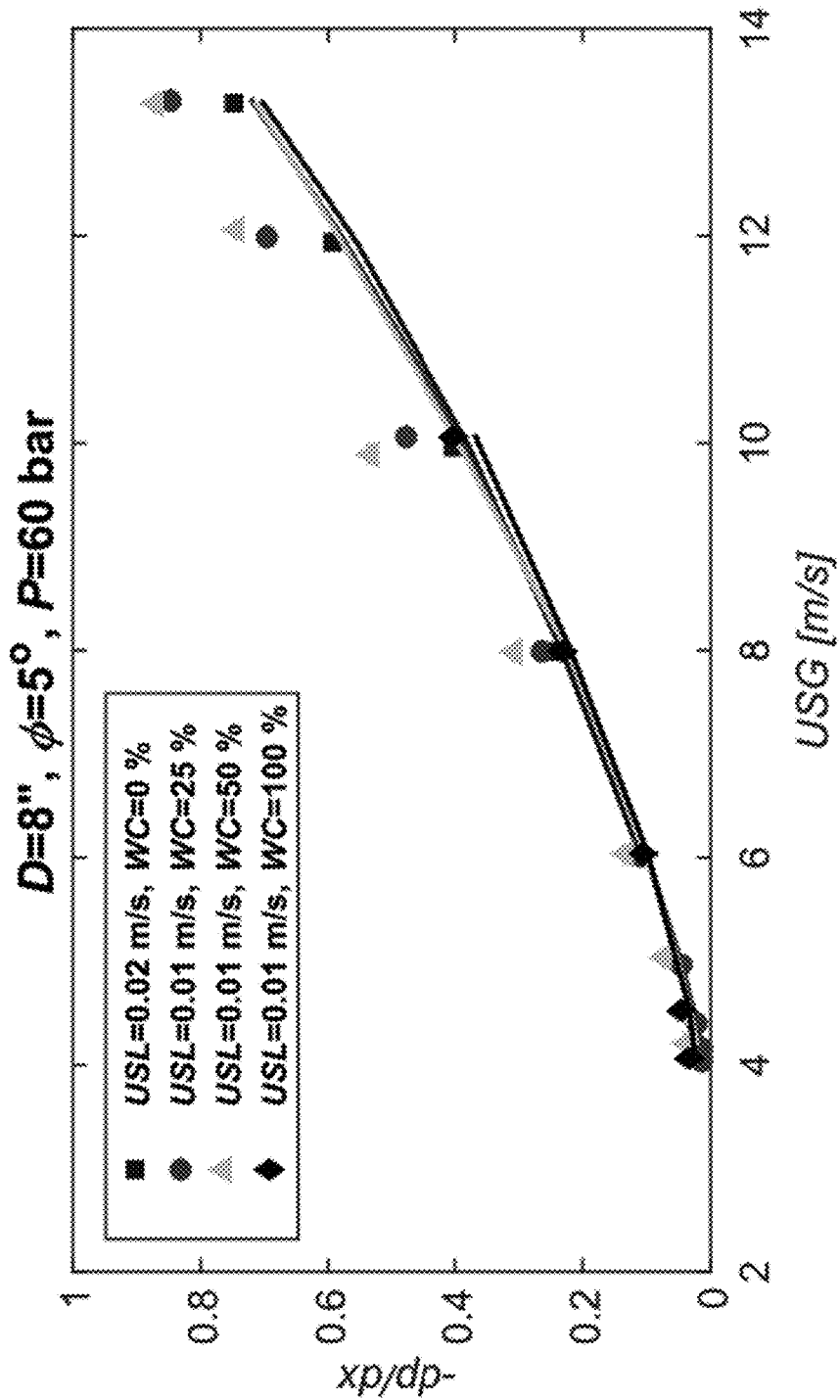
FIG. 1 is a diagram showing measured pressure drops in a pipeline segment for various flows as compared to predicted pressure-drop in a similar pipeline segment made by a prior art computational fluid dynamic model available under the trademark LedaFlow 2.4. The experimental measurements are presented in Kjolaas et al. [2].
Figure 2:
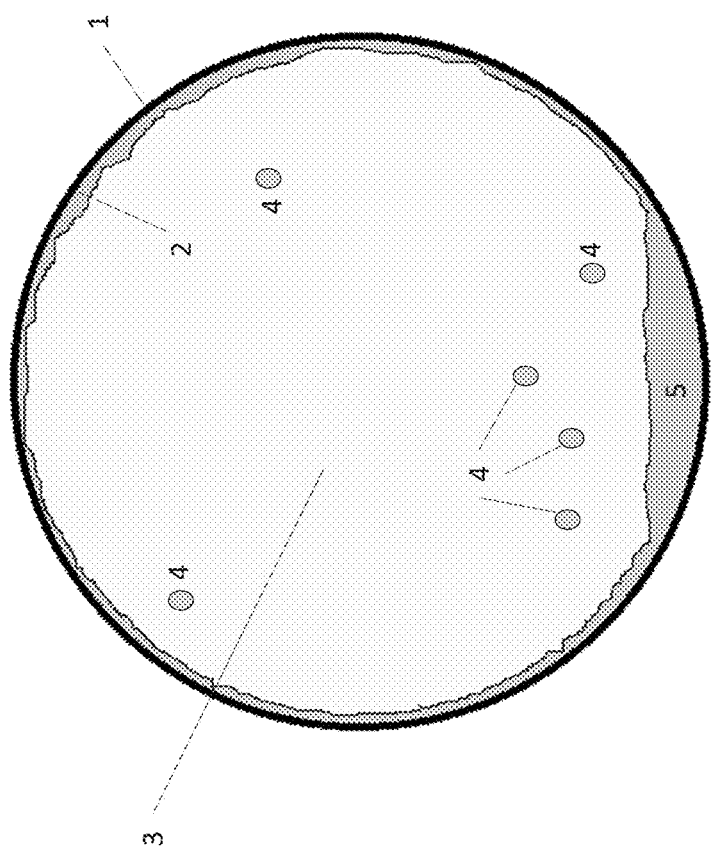
FIG. 2 is a drawing schematically illustrating the assumed droplet induced formation of a liquid film on the gas/inner wall interface.
Figure 3:
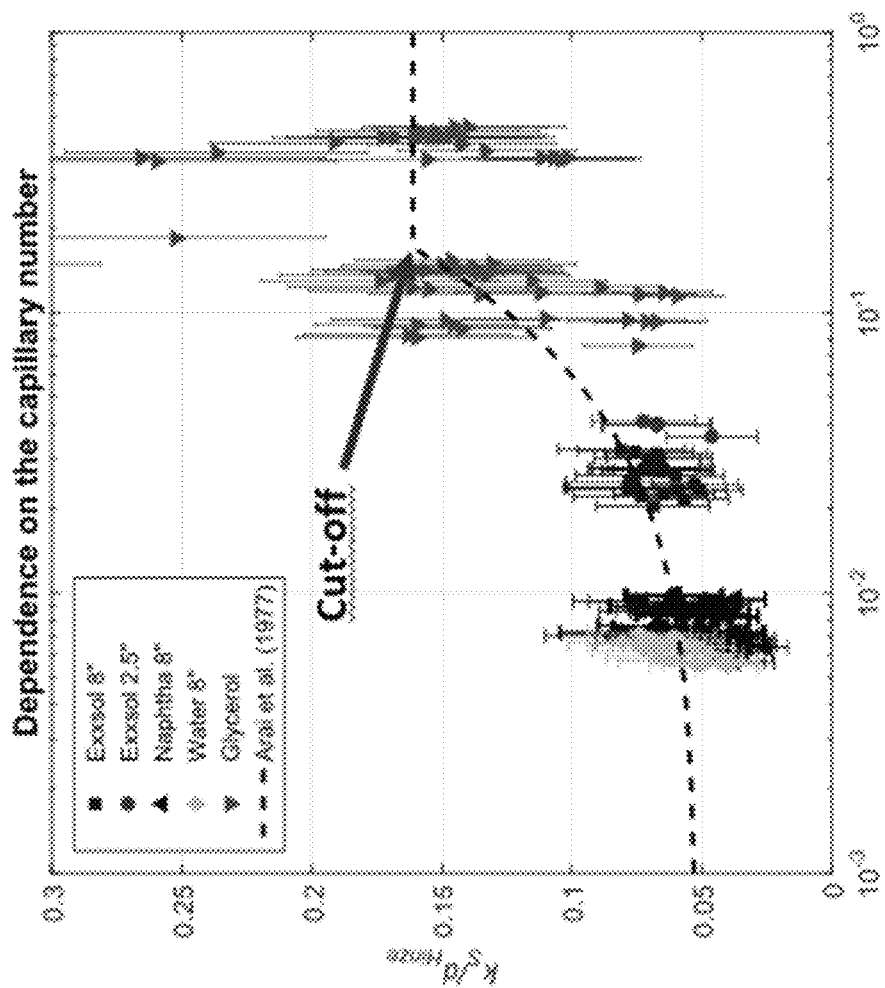
FIG. 3 is a diagram showing the ratio between surface roughness at the gas/inner wall interface and the droplet size determined by Hinze droplet model [10] plotted against capillary number. The dotted line marked "Equation (13)" corresponds to eqn. (7) herein.
Figure 4:
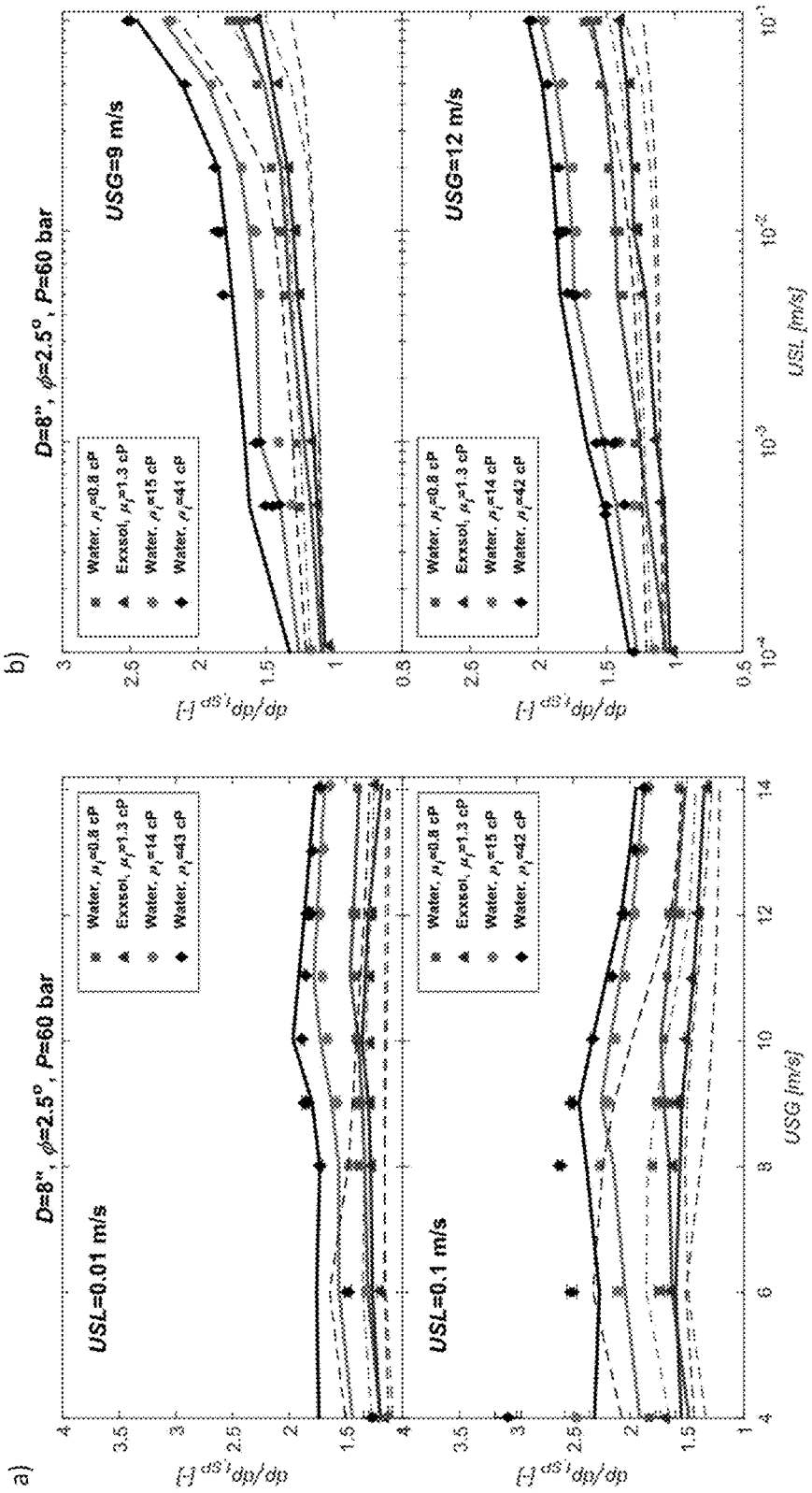

FIGS. 4a) and 4b) display diagrams showing measured and predicted pressure drops for different two-phase flows at different gas flow velocities. The markers represent measured values, the dashed lines represent the predictions made by a prior art computational fluid dynamic model, while the solid lines represent the predictions made by a similar computational fluid dynamic model adapted according to the present invention.

Figure 5:
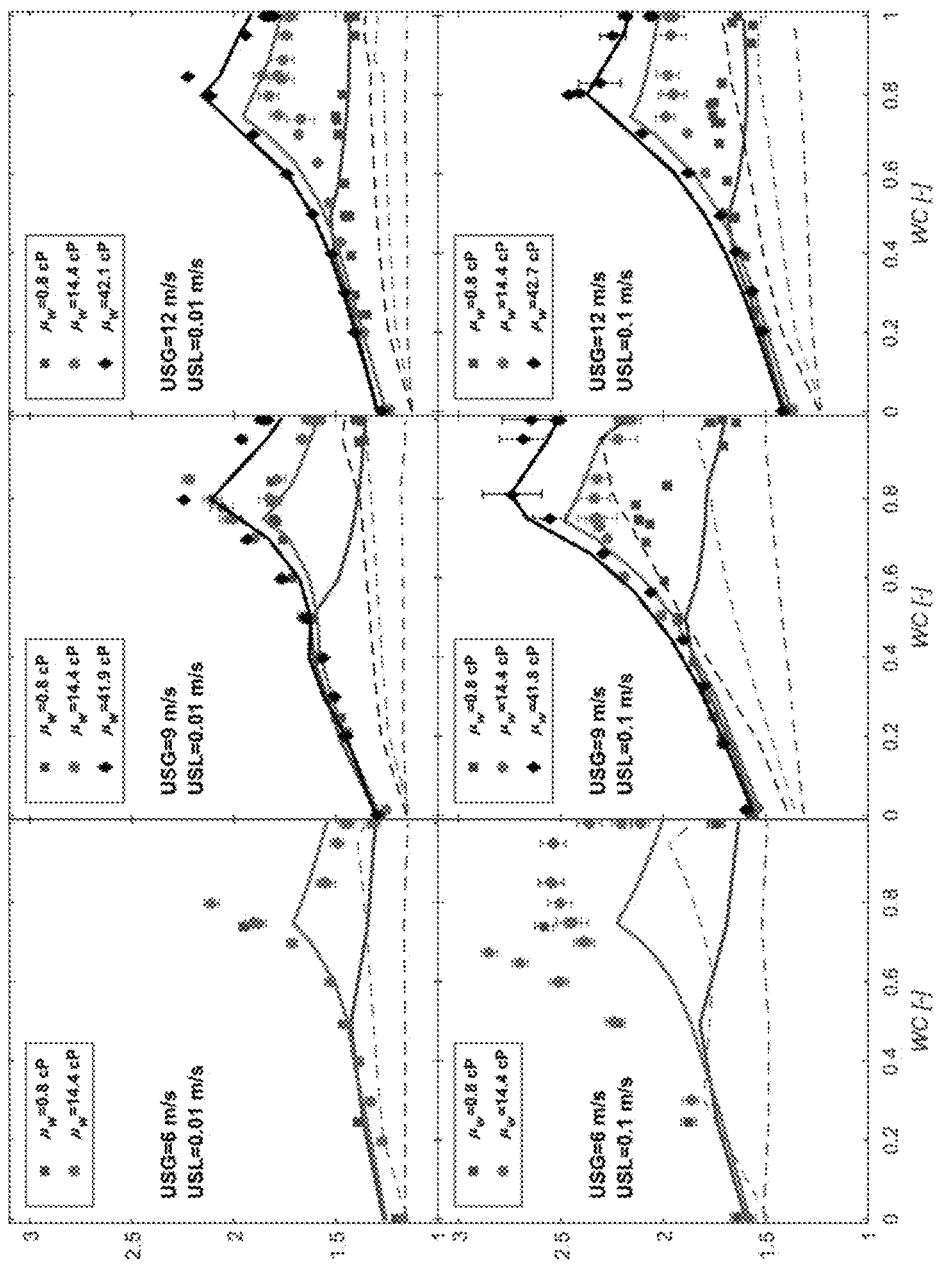

FIG. 5 displays diagrams showing measured and predicted normalized pressure drops for different three-phase flows at different gas flow velocities and water cuts. The markers represent the measured values, the dashed lines represent the predictions made by a prior art computational fluid dynamic model, while the solid lines represent the predictions made by a similar computational fluid dynamic model adapted according to the present invention.

Figure 6:
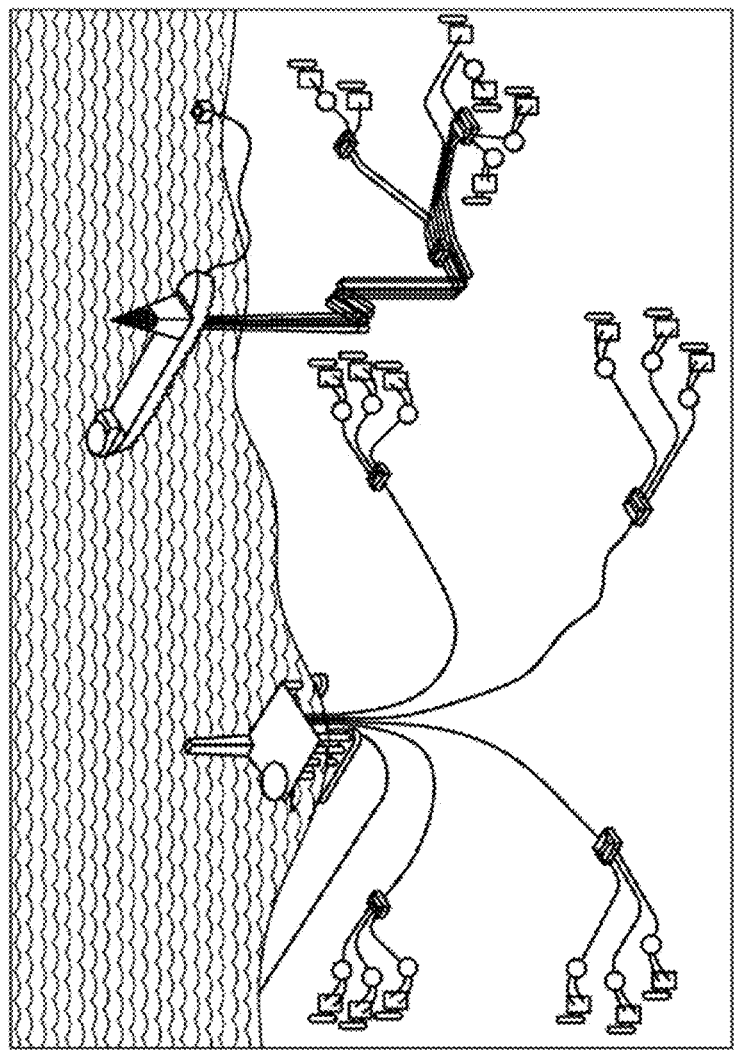

FIG. 6 is a facsimile of FIG. 14 of US 2010/0059221 showing an example of a production system.

VERIFICATION OF THE INVENTION

The invention is demonstrated by first providing an example embodiment of a simple mathematical model for a two-phase flow showing how the mathematical model may be adapted to incorporate the correction of the shear forces according to the invention at the gas/wall interface. And further by presenting a comparison of predictions of the pressure drop made by a commercial computational fluid dynamic model marketed under the trademark "LedaFlow 2.4" and by a new version of the same commercial computational fluid dynamic model having incorporated the correction of the shear forces according to the invention and which is just being released under the trademark "LedaFlow 2.5". The predictions are compared to experimental measurements of the pressure drop.

Example Embodiment of a Mathematical Model Having Incorporated the Invention The example embodiment of the computational fluid dynamical model is a so-called "steady-state point model", which predicts the pressure drop and phase fractions given a set of input parameters, which are:
1. Pipe inner diameter D, wall surface roughness $k_s$ and inclination $\theta$.
2. The volumetric flow rates for each continuous fluid phase.
3. The thermodynamic properties of each continuous fluid phase (comprises at least densities, viscosities and surface tensions of the fluid phases).

The example embodiment of computational fluid dynamic model is called a "point model" because it only provides predictions locally in a system. By "locally", we mean a region small enough such that we can assume that all the fluid properties are constant in that region. The example embodiment further assumes the following:

4. The flow consists of one liquid phase and one gas phase (two-phase flow), both of which are considered incompressible.
5. The flow is stratified with liquid droplets, which means that the liquid flows as a continuous liquid phase at the bottom of the pipe, and possibly also as droplets entrained in the gas above.
6. The interface between the continuous liquid phase at the bottom of the pipe and the gas is assumed to be flat.
7. The flow is steady and fully developed, meaning that the flow does not change in time or in space. Mathematically, this is equivalent to assuming that all temporal and spatial derivatives in the mass/momentum equations are zero.
8. The liquid droplets travel at the same velocity as the gas.

The mass balance equations for the example may be given as:

$$\frac{Q_g}{A} = \alpha_g u_g \qquad (16)$$

$$\frac{Q_l}{A} = \alpha_l u_l + \alpha_{droplet} u_g \qquad (17)$$

where $Q_g$ and $Q_l$ are the volumetric gas and liquid flow rates, A is the cross section area of the pipe, $\alpha_g$, $\alpha_l$ and $\alpha_{droplet}$ are the volumetric fractions of the gas, the liquid film at the bottom of the pipe, respectively, and the liquid droplets, $u_g$ is the gas velocity, and $u_l$ is the velocity of the continuous liquid phase at the bottom of the pipe.

The momentum equations for the gas zone (continuous gas phase and liquid droplets) and the continuous liquid phase for this model are:

$$(\alpha_g + \alpha_{droplet})\frac{dp}{dx} + \frac{S_g \tau_g}{A} + \frac{S_i \tau_i}{A} + (\alpha_g + \alpha_{droplet})\rho_g g \sin\theta = 0 \qquad (18)$$

$$\alpha_l \frac{dp}{dx} + \frac{S_l \tau_l}{A} - \frac{S_i \tau_i}{A} + \alpha_l \rho_l g \sin\theta = 0 \quad (19)$$

Here, dp/dx is the pressure gradient, $\rho_g$ is the gas density, pi is the liquid density, $S_g$ is the gas-wall perimeter, $S_l$ is the film-wall perimeter, $S_i$ is the width of the gas-liquid interface, $\tau_g$ is the gas-wall shear stress, $\tau_l$ is the liquid film shear stress, and $\tau_i$ is the shear stress between the gas and liquid at the interface. From geometrical considerations, it can be shown that the parameters $\alpha_l$ and $S_l$ are related as follows for a flat continuous liquid layer in a circular pipe:

$$\alpha_l = \frac{1}{2\pi}\left[\frac{S_l}{D} - \sin\frac{S_l}{D}\right] \quad (20)$$

Furthermore, the relationship between the interface width $S_i$ and the film perimeter $S_l$ is:

$$S_i = D\cos\frac{S_l}{2D} \quad (21)$$

Finally, we have that the sum of the wall perimeters $S_g$ and $S_l$ must equal the total pipe perimeter.

The shear stresses can be expressed as follows:

$$\tau_g = \frac{1}{2}f_g \rho_g |u_g| u_g \quad (22)$$

$$\tau_l = \frac{1}{2}f_l \rho_l |u_l| u_l \quad (23)$$

$$\tau_i = \frac{1}{2}f_i \rho_g |u_g - u_l|(u_g - u_l) \quad (24)$$

Here, $f_g$, $f_l$ and $f_i$ are the friction factors for the gas, the liquid film and the interface, and these friction factors require closure laws.

The example model incorporates the inventive determination of the gas flow resistance by applying the Haland model [13] as closure law for determination of the shear stress at the gas/inner wall interface, i.e. to determine the gas friction coefficient, $f_g$, from the effective surface roughness, $k_{eff}$, as defined in relations (1) or preferably by relations (11) to (13) given above.

In most prior art models, the $k_{eff}$ parameter takes on the value for a dry pipeline wall, which is part of the user input to the model. However, in the example model, the value of $k_{eff}$ is determined as given in equations (1) and (3) to (7) given above to take into account for droplets depositing on the wall, creating a liquid film at the gas/inner wall interface which has a roughness that is significantly different from the effective surface roughness of a dry pipe wall.

For the continuous liquid phase, the example model applies the same closure law, which in this case may be given as:

$$\frac{1}{\sqrt{f_l}} = -3.6\log\left[\frac{6.9}{Re_l} + \left(\frac{k_{eff,l}}{3.7 D_{hl}}\right)^{1.11}\right] \quad (25)$$

Here $Re_l$ is the Reynolds number of the continuous liquid, which is usually expressed as:

$$Re_l = \frac{\rho_l D_{hl} u_l}{\mu_l} \quad (26)$$

where:

$$D_{hl} = \frac{4\alpha_l A}{S_l} \quad (27)$$

However, for the liquid-wall shear stress, $k_{eff,l}$, takes on the value provided as user input for the surface roughness of the pipeline wall.

There are many proposed closure laws for the interfacial friction factor in the literature which may be applied to close the model over the gas-liquid interface. The example model applies a correlation proposed by Andritsos & Hanratty [14]:

$$f_i = \left(-3.6\log\frac{6.9}{Re_g}\right)^{-2}\left(1 + 15\frac{h_l}{D}\max\left(\frac{u_g}{5} - 1, 0\right)\right) \quad (28)$$

Here, $h_l$ is the centre line depth of the continuous liquid phase.

To calculate the droplet fraction $\alpha_{droplet}$, another closure law is needed. The example model applies a model suggested by Ishii & Mishima [15] to calculate the total droplet fraction $\alpha_{droplet}$:

$$\alpha_{droplet} = \frac{Q_l}{A \cdot u_g}\tanh[7.25 \cdot 10^{-7} We^{1.25} Re_{liq}^{0.25}] \quad (29)$$

where $$We = \frac{\rho_g D u_g^2}{\sigma}\left(\frac{\rho_l - \rho_g}{\rho_g}\right)^{\frac{1}{3}} \quad (30)$$

and $$Re_{liq} = \frac{Q_l \rho_l D}{A \mu_l} \quad (31)$$

The example model is now complete as an example embodiment of the invention according to the first aspect.

However, the example model may further comprise a model for determination of the droplet concentration and thus be an example embodiment of the invention according to the second aspect. The example embodiment, for the sake of simplicity, assumes that the droplet concentration drops linearly with the vertical distance above the gas-liquid interface, and that it reaches a value of zero at the top of the pipe and that the pipe is shaped as a rectangular duct, the local concentration of droplets $C_{in\,gas}^{droplet}(y)$, may be given by:

$$C_{in\,gas}^{droplet}(y) = 2\alpha_{droplet}\left(1 - \frac{y}{h_g}\right) \quad (32)$$

where y is the vertical distance from the interface, and $h_g$ is the distance from the gas-liquid interface to the top of the pipe.

Eqn. (32) may then be applied together with eqn. (2) to determine whether the effective surface roughness, $k_{eff}$, at the gas/inner wall interface is to be determined by relation (1) or preferably by relations (12) to (14) given above, or to be defined to be equal to a surface roughness of a dry inner wall of the pipeline.

Comparison of Measured and Predicted Pressure Drops

The invention according to the invention is further verified by a comparison of predicted pressure-drops for various two-phase flows in a pipeline segment by a prior art commercially available computational fluid dynamic model as compared to the predicted pressure-drops by a just released upgraded version of a similar computational fluid dynamic model having incorporated the inventive approach for determining the shear-stresses at the gas/inner wall interface. The predictions are compared to measured pressure-drops for 10 different.

The experimental measurements of the pressure-drop were conducted at the SINTEF Multiphase Flow Laboratory applying their "Large Scale Loop Facility" adapted with a 94-meter-long 8"pipe with an inclination angle 2.5°. The nominal pressure was 60 bara, yielding a gas density of 67 kg/m$^3$. For the experiments, nitrogen was used as the gas phase and Exxsol D60 as oil phase. For the aqueous phase, we used regular tap water with NaOH for corrosion protection, with and without glycerol. The purpose of adding glycerol was to increase the viscosity of the aqueous phase, emulating MEG injection. In the experiments with glycerol, the volumetric concentration was in the range 70-74%. The glycerol experiments were conducted at temperatures 23° C. and 45° C. yielding viscosities of about 42 and 14 cP, respectively, while the experiments without glycerol were conducted at 30° C. When changing the temperature, we also adjusted the pressure such that the gas density was kept the same in all the experiments. Additional details regarding the experimental set-up and execution are presented in Kjolaas et al. [1, 2].

The commercially available computational fluid dynamic model is sold under the trademark "LedaFlow 2.4" by LedaFlow Technologies DA. The LedaFlow 2.4 model describes thus the multiphase fluid as consisting of continuous fluid phases being separated by large-scale interfaces and of dispersed fluid phases suspended in one or more of the continuous fluid phases. The LedaFlow 2.4 applies the typically prior art approach for determining the shear-stresses at the gas/inner wall interface by assuming the effective surface roughness being equal to the surface roughness of a dry pipeline wall.

The upgraded version of the computational fluid dynamic model is going to be marketed under the trademark "LedaFlow 2.5" and is similar to the LedaFlow 2.4 model except that the assumptions presented above for the effect on the shear-stresses by the formation of a liquid film on the gas/inner wall are incorporated into the model. The LedaFlow 2.5 model applies the approach according to the second aspect of the invention utilising the critical droplet concentration criteria as given in eqn. (2) above to determine how much of the gas-wall perimeter is dry (with an effective surface roughness equal to $k_{eff,2}$), and how much of the gas-wall perimeter is covered by a liquid film (with an effective surface roughness of equal to $k_{eff,1}$). The LedaFlow 2.5 model is adapted to apply eqn. (7) to determine $k_{eff,1}$ when the multiphase flow is a two-phase flow, and to apply eqn. (8) to determine $k_{eff,1}$ when the multiphase flow is a three-phase flow comprising two immiscible liquids and a gas phase.

Two-Phase Flow

FIG. 4a) shows two diagrams presenting measured and predicted pressure drops plotted against the superficial gas velocity USG. In the top graph, the superficial liquid velocity USL is 0.01 m/s, and in the bottom graph USL equals 0.1 m/s. FIG. 4b) shows two diagrams presenting measured and predicted pressure drops plotted against the superficial liquid velocity USL. In the top graph, the superficial gas velocity USG is 9 m/s, and in the bottom graph USG equals 12 m/s.

The predictions are made by the prior art computational fluid dynamic model LedaFlow 2.4 and by the computational fluid dynamic model (LeadFlow 2.5) adapted according to the present invention. The experimental measurements are presented in Kjolaas et al. [1, 2]. The markers represent measured values, the dashed lines represent the predictions made by LedaFlow 2.4, while the solid lines represent the predictions made by LedaFlow 2.5.

As seen from the figures, the prior art model (LedaFlow 2.4) systematically under-predicts the pressure drop at these conditions, while the model adapted according to the present invention (LedaFlow 2.5) is in much better agreement with the measurements.

Three-Phase Flow

FIG. 5 is a diagram showing the normalized pressure drop plotted against the water cut for three different gas rates (USG=6, 9 and 12 m/s), and two different liquid rates (USL=0.01 and 0.1 m/s). Each graph contains data for one or more fluid systems (with/without glycerol), where the main distinguishing factor is the water viscosity. The markers in the graphs represent the measured values, while the lines are predictions. The dashed lines are predictions obtained with the prior art LedaFlow 2.4 model, while the solid lines are predictions by the model (LedaFlow 2.5) adapted according to the invention. Both models applied the Brinkman emulsion model [12].

FIG. 5 shows that also for the three-phase flow, the model adapted according to the invention is significantly more accurate in prediction the pressure-drop than the prior art model which does not compensate for the liquid film effect on the gas flow resistance.

It is noted that the model adapted according to the invention obtains a maximum pressure drop at a water cut of 50% while the experiments indicate a maximum pressure-drop at a water cut of 80%. The predictions in the high water cut range are thus low compared to experiments for this fluid system. It is assumed that the main reason for this discrepancy is that an oil-continuous emulsion forms on the wall. However, such behaviour is difficult model and is outside the objective of the hydrodynamic modelling approach of the present invention.

Nevertheless, the verification presented above clearly shows that the above presented assumption of describing the effective surface roughness by a liquid droplet model at the gas/inner wall interface when a liquid film may be assumed formed, is a simple and computational effective correction of the shear-stresses at the gas/inner wall interface obtaining significantly improved pressure-drop predictions as compared to prior art models assuming the shear-stresses are due to the surface roughness of the (dry) pipeline wall.

REFERENCES

1. Jan Kjølaas, "Large scale experiments on high-rate three-phase low liquid loading flows", 18$^{th}$ International Conference on Multiphase Production Technology, Cannes 2019.
2. Jan Kjølaas et al., "Pressure drop measurements in low liquid loading three-phase flows", 17$^{th}$ International Conference on Multiphase Production Technology, Cannes 2017.
3. J. Laurinat, T. Hanratty and W. Jepson, "Film thickness distribution for gas liquid annular flow in a horizontal pipe," PCH Physicochem. Hydrodyn., vol. 6, p. 179-195, 1985.

4. M. Bonizzi and P. Andreussi, "Prediction of the liquid film distribution in stratified dispersed gas-liquid flow," *Chemical Engineering Science*, vol. 142, p. 165-179, 2016.
5. G. Wallis, One-dimensional Two-phase Flow, New York: McGraw-Hill, 1969.
6. R. J. Belt and L. M. Portela, "Prediction of the interfacial shear-stress in vertical annular flow", *International Journal of Multiphase Flow*, vol. 35, no. 7, p. 689-697, 2009.
7. J. Asali and T. Hanratty, "Interfacial Drag and Film Height for Vertical Annular Flow," *AIChE Journal*, vol. 31, no. 6, pp. 895-902, 1985.
8. J. J. v. Rossum, "Experimental Investigation of Horizontal Liquid Films," *Chem. Eng. Sci.*, 11, 35 ( )., vol. 11, no. 1, pp. 35-52, 1959.
9. D. Biberg, C. Lawrence, G. Staff and H. Holm, "Pressure drop in low liquid loading flows—the effect of a thin liquid film on the pipe wall," in BHRG, Cannes, France, 2017.
10. J. O. Hinze, "Fundamentals of the hydrodynamic mechanism of splitting in dispersion process," *AIChE*, vol. 289, no. 1, 1955.
11. K. Arai, M. Konno, Y. Matunaga and S. Saito, "Effect of Dispersed-phase viscosity on the maximum stable drop size for break up in turbulent flow," *Journal of chemical engineering of Japan*, vol. 10, no. 4, 1977.
12. H. Brinkman, "The viscosity of concentrated suspensions and solutions," *J. Chem. Phys.*, vol. 20, no. 4, pp. 571-584, 1952.
13. Haaland, S E. "Simple and Explicit Formulas for the Friction Factor in Turbulent Flow". *Journal of Fluids Engineering*, vol 105 no. 1, pp. 89-90, 1983
14. N. Andritsos and T. J. Hanratty, "Interfacial instabilities for horizontal gas-liquid flows in pipelines," *Int. J. Multiphase Flow*, vol. 13, pp. 583-603, 1987.
15. M. Ishii and K. Mishima, "Two-fluid model and hydrodynamic constitutive relations," *Nuclear Engineering and Design*, vol. 82, pp. 107-126, 1984.

The invention claimed is:

1. A computer implemented method for determining pressure-drop in a multiphase flow in a non-vertical pipeline having an inner wall facing the multiphase flow, where the multiphase flow at least comprises a continuous gas phase forming a gas/inner wall interface and a continuous liquid phase, and
wherein the method comprises:
applying a computational fluid dynamic model describing the multiphase flow, and
solving the computational fluid dynamic model to determine the pressure-drop in the multiphase flow by
applying an effective surface roughness, $k_{eff}$, determined by a relation: $k_{eff} = K \cdot d_{droplet}^{max}$, where K is a correlation coefficient and $d_{droplet}^{max}$ is a maximum stable droplet size as determined by a droplet model;
applying the effective surface roughness, $k_{eff}$, to determine a shear-stress, $\tau_g$; and
applying the shear-stress, $\tau_g$, as a boundary condition determining gas flow resistance at the gas/inner wall interface; and
optimizing one or more dimensions of the non-vertical pipeline based on the pressure-drop determined by the computational fluid dynamic model.

2. The computer implemented method according to claim 1, wherein the computational fluid dynamic model describes the multiphase flow as a set of fluid fields representing:
a set of continuous fluid phases being separated by a large-scale interfaces, at least comprising a continuous liquid phase and a continuous gas phase being separated by a large-scale gas/liquid interface, and
a set of dispersed phases, at least comprising a dispersed phase of liquid droplets entrained in the continuous gas phase,
and wherein
each fluid field is described by Eulerian formulated volume and ensemble averaged turbulent transport equations which are solved independently for each fluid field by applying a volume of fluid method for each fluid field representing a continuous phase and a dispersed flow method for each fluid field representing a dispersed fluid phase.

3. The computer implemented method according to claim 1, wherein $d_{droplet}^{max}$, is given by the relation:

$$d_{droplet}^{max} = 0.725 \left(\frac{\sigma^*}{\rho_g}\right)^{0.6} \varepsilon^{-0.4}$$

where $\sigma^* = \sigma_{gl}(1 + k \cdot Ca)$, where $\sigma_{gl}$ is the surface tension between the liquid and the gas, k is a correlation coefficient, and Ca is a capillary number defined to be:

$$Ca = \frac{\mu_d (\varepsilon \cdot d_{droplet}^{max})^{\frac{1}{3}}}{\sigma_{gl}}$$

where $\mu_d$ is a dynamic viscosity of the liquid droplet, $\rho_g$ is volumetric density of the continuous gas phase, and $\varepsilon$ is an energy dissipation rate per unit mass given by a relation:

$$\varepsilon = \frac{S_g \tau_g u_g + S_i \tau_i \Delta u}{0.25(S_g + S_i)\rho_g D_{hg}}$$

where $S_g$ is a gas perimeter, $\tau_g$ is the gas/inner wall shear stress, $u_g$ is a gas velocity, $S_i$ is a interface perimeter, $\tau_i$ is an interfacial shear stress, $\Delta u$ is a gas-liquid slip velocity, and $D_{hg}$ is a hydraulic diameter for the continuous gas phase.

4. The computer implemented method according to claim 1, wherein the multiphase flow is a two-dimensional flow and the effective surface roughness $k_{eff}$ for liquid film covered gas/inner wall interface is given by the correlation:

$$k_{eff} = 0.052 \cdot \min[(1+33 \cdot Ca), 6.6]^{0.6} d_{Hinze}$$

where $d_{Hinze}$ is $$d_{Hinze} = 0.725 \left(\frac{\sigma_{gl}}{\rho_g}\right)^{0.6} \varepsilon^{-0.4},$$

$\sigma_{gl}$ is a gas-liquid surface tension, $\rho_g$ is gas density, and $\varepsilon$ is an energy dissipation rate per unit mass given by a relation:

$$\varepsilon = \frac{S_g \tau_g u_g + S_i \tau_1 \Delta u}{0.25(S_g + S_i)\rho_g D_{hg}},$$

where $S_g$ is a gas perimeter, $\tau_g$ is a gas-wall shear stress, $u_g$ is a gas velocity, $S_i$ is an interface perimeter, $\tau_i$ is an interfacial shear stress, $\Delta u$ is a gas-liquid slip velocity, and $D_{hg}$ is a hydraulic diameter for the continuous gas phase, and Ca is a capillary number defined to be:

$$Ca = \frac{\mu_d(\varepsilon \cdot d_{Hinze})^{\frac{1}{3}}}{\sigma_{gl}},$$

where $\mu_d$ is a dynamic viscosity of a liquid droplet.

5. The computer implemented method according to claim 1, wherein the multiphase flow is a three-dimensional flow comprising a first and a second liquid, and the correlation coefficient, K, is:

$$K = 0.052 \cdot \left( \min(1 + 33 \cdot Ca, \ 6.6) + 33 \cdot \left( \frac{\mu_l^{eff}}{\mu_l^{pure}} - 1 \right) \cdot Ca \right)^{\frac{3}{5}},$$

where Ca is a capillary number:

$$Ca = \frac{\mu_l^{eff}(\varepsilon \cdot d_{Hinze})^{\frac{1}{3}}}{\sigma_{eff}},$$

where $\sigma_{eff}$ is an effective surface tension of a mixed first and second liquid:

$$\sigma_{eff} = \frac{\alpha_1 \sigma_1 + \alpha_2 \sigma_2}{\alpha_1 + \alpha_2},$$

where $\alpha_1$ is a fraction of pipeline wall covered by the first liquid, $\alpha_2$ is a fraction of pipeline wall covered by the second liquid, $\sigma_1$ is a surface tension of the first liquid, $\sigma_2$ is a surface tension of the second liquid, and where $\mu_l^{eff}$ is an effective dynamic viscosity of the mixed liquid:
$\mu_l^{eff} = \mu_l^{pure}(1-\varphi)^{-2.5}$, where $\varphi$ is a droplet concentration of the first liquid being in suspension in second liquid phase, or alternatively, the droplet concentration of second liquid being in suspension in the first liquid phase.

6. The computer implemented method according to claim 1, wherein the non-vertical pipeline has an inclination angle in a range of from −75° to +75°, where a positive inclination angle corresponds to the pipeline ascending in the flow direction, a negative inclination angle corresponds to the pipeline descending in the flow direction, and an inclination angle of 0° corresponds to the pipeline being horizontal relative to the earth gravitational field.

7. A computer implemented method for designing a pipeline-based fluid transport system for transport of multiphase fluids, where the method comprises:
applying the method according to claim 1 to numerically predict the pressure-drop when loading an intended flow rate volume of the multiphase fluid through a set of pipeline segments having different inner diameters and inclination angles towards the earth gravitational field; and
optimizing, the pressure-drop determined by the computational fluid dynamic model, a pipeline diameter and a pipeline trajectory/path in a terrain/seabed with aim of minimising material use in the pipeline-based fluid transport system and energy consumption for operating the pipeline-based fluid transport system.

8. A computer, comprising a processing device and a computer memory, the computer memory is storing a computer program comprising processing instructions which causes a computer to perform the method according to claim 1 when the instructions are executed by a processing device in the computer.

9. A computer implemented method for determining pressure-drop in a multiphase flow in a non-vertical pipeline having an inner wall facing the multiphase flow, where multiphase flow at least comprises a continuous gas phase forming a gas/inner wall interface and a continuous liquid phase, and
wherein the method comprises:
applying a computational fluid dynamic model describing the multiphase flow, and
solving the computational fluid dynamic model to determine the pressure-drop in the multiphase flow by:
determining a first fraction of the gas/inner wall interface considered being covered by a liquid film and a second fraction of the gas/inner wall interface considered not being covered by a liquid film,
for the first fraction; applying an effective surface roughness, $k_{eff,1}$, determined by a relation: $k_{eff,1} = K \cdot d_{droplet}^{max}$, where K is a correlation coefficient and $d_{droplet}^{max}$ is a maximum stable droplet size as determined by a droplet model, and applying the effective surface roughness, $k_{eff,1}$, to determine a shear-stress, $\tau_{g,1}$, and
for the second fraction; applying an effective surface roughness, $k_{eff,2}$, defined to be equal to a surface roughness of a dry inner wall of the pipeline, and applying the effective surface roughness, $k_{eff,2}$, to determine a shear-stress, $\tau_{g,2}$, and
applying the shear-stresses, $\tau_{g1}$ and $\tau_{g2}$ as boundary conditions determining a gas flow resistance at the gas/inner wall interface; and
optimizing one or more dimensions of the non-vertical pipeline based on the pressure-drop determined by the computational fluid dynamic model.

10. The computer implemented method according to claim 9, wherein the computational fluid dynamic model describes the multiphase flow as a set of fluid fields representing:
a set of continuous fluid phases being separated by large-scale interfaces, at least comprising a continuous liquid phase and a continuous gas phase being separated by a large-scale gas/liquid interface, and
a set of dispersed phases, at least comprising a dispersed phase of liquid droplets entrained in the continuous gas phase,
and wherein
each continuous fluid field is described by Eulerian formulated volume and ensemble averaged turbulent transport equations which are solved for each continuous fluid field, and
each of the dispersed phases is described by "slip relations", which are expressions that describe a velocity difference between dispersed fields and an associated continuous field.

11. The method according to claim 10, wherein the determination of the first fraction of the gas/inner wall interface considered being covered by a liquid film and the second fraction of the gas/inner wall interface considered not being covered by a liquid film is obtained by:

- determining a liquid droplet concentration profile, $C_{in\ gas}^{droplet}(y)$, in the continuous gas phase as a function of vertical distance above the large-scale interface separating the continuous liquid phase and the continuous gas phase,
- determining a critical droplet concentration profile $C_{crit}^{droplet}$ by a relation:
- $\log_{10} C_{crit}^{droplet} = -\min[\max(250 \cdot \sigma_{gl}, 4.0), 9.0]$, where $\sigma_{gl}$ is a gas-liquid surface tension, and
- applying the determined liquid droplet concentration profile, $C_{in\ gas}^{droplet}(y)$ at the gas/inner wall interface and define the part of the gas/inner wall interface where the $C_{in\ gas}^{droplet}(y) \geq C_{crit}^{droplet}$ is satisfied to be the first fraction, and similarly define the part of the gas/inner wall interface where the $C_{in\ gas}^{droplet}(y) < C_{crit}^{droplet}$ is satisfied to be the second fraction.

* * * * *